(12) United States Patent
Montorsi et al.

(10) Patent No.: US 12,137,021 B2
(45) Date of Patent: Nov. 5, 2024

(54) MODULATION METHOD AND APPARATUS

(71) Applicant: HUAWEI TECHNOLOGIES CO., LTD., Guangdong (CN)

(72) Inventors: Guido Montorsi, Turin (IT); Sergio Benedetto, Turin (IT); Wei Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 62 days.

(21) Appl. No.: 17/961,709

(22) Filed: Oct. 7, 2022

(65) Prior Publication Data

US 2023/0092517 A1 Mar. 23, 2023

Related U.S. Application Data

(63) Continuation of application No. PCT/CN2021/086030, filed on Apr. 8, 2021.

(30) Foreign Application Priority Data

Apr. 8, 2020 (CN) .......................... 202010270587.3

(51) Int. Cl.
*H04L 27/36* (2006.01)
*H04L 27/34* (2006.01)

(52) U.S. Cl.
CPC ................ *H04L 27/3405* (2013.01)

(58) Field of Classification Search
CPC .......... H04L 25/03159; H04L 27/3405; H04L 27/3483; H04L 1/0063; H04L 27/0008; H04L 17/336; H04B 1/0475; H04B 17/336; H04B 1/713; H04W 72/121; H04W 72/0446
USPC ........................................ 375/298
See application file for complete search history.

(56) References Cited

U.S. PATENT DOCUMENTS

| | | | |
|---|---|---|---|
| 9,967,127 B1 | 5/2018 | Sun et al. | |
| 10,511,466 B2* | 12/2019 | Loghin | H04L 1/0071 |
| 2014/0198684 A1* | 7/2014 | Gravely | H04W 24/02 |
| | | | 370/254 |

(Continued)

FOREIGN PATENT DOCUMENTS

| | | |
|---|---|---|
| CN | 105656833 A | 6/2016 |
| CN | 109428700 A | 3/2019 |

(Continued)

OTHER PUBLICATIONS

3GPP TR 36.776 V1.1.0 (Feb. 2019), 3rd Generation Partnership Project;Technical Specification Group Radio Access Network;Evolved Universal Terrestrial Radio Access (E-UTRA);Study on LTE-based 5G terrestrial broadcast(Release 16), 33 pages.

(Continued)

*Primary Examiner* — Khai Tran

(57) ABSTRACT

A modulation method, including: modulating data by using a non-uniform constellation; and sending the modulated data. When the non-uniform constellation provided in embodiments of this application is used, for each noise standard deviation, a BER of the non-uniform constellation provided in embodiments of this application is lower than a BER of an existing QAM constellation.

3 Claims, 11 Drawing Sheets

(56) References Cited

U.S. PATENT DOCUMENTS

| | | | |
|---|---|---|---|
| 2016/0204971 A1* | 7/2016 | Mouhouche | H04L 1/0063 370/207 |
| 2016/0366003 A1* | 12/2016 | Kwon | H04W 72/0473 |
| 2019/0173502 A1* | 6/2019 | Kimura | H04J 7/02 |

FOREIGN PATENT DOCUMENTS

| | | |
|---|---|---|
| CN | 110380999 A | 10/2019 |
| CN | 110913476 A | 3/2020 |

OTHER PUBLICATIONS

IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

International Search Report and Written Opinion issued in PCT/CN2021/086030, dated Jun. 29, 2021, 9 pages.

Notice of Allowance issued in CN202010270587.3, dated Jan. 16, 2023, 4 pages.

Office Action issued in CN202010270587.3, dated Jun. 21, 2022, 6 pages.

\* cited by examiner

MODULATION METHOD AND APPARATUS

CROSS-REFERENCE TO RELATED APPLICATIONS

This application a continuation of International Application No. PCT/CN2021/086030, filed on Apr. 8, 2021, which claims priority to Chinese Patent Application No. 202010270587.3, filed on Apr. 8, 2020. The disclosures of the aforementioned applications are herein incorporated by reference in their entireties.

TECHNICAL FIELD

Embodiments of this application relate to the communication field, and in particular, to a modulation method and apparatus.

BACKGROUND

WLAN transmission standards such as IEEE 802.11n/ac/ax/be focus on improving user experience in large-bandwidth scenarios, including improving average user throughput and energy efficiency of battery-powered devices. High-speed and reliable transmission of services such as data and video need to be performed on limited frequency and power resources. Therefore, channel coding, modulation, and demodulation solutions with high reliability and efficiency are required. So far, in the field of modulation and demodulation, a quadrature amplitude modulation (QAM) constellation can support a system to achieve good spectral efficiency, and has been widely used in the communication field. Therefore, the QAM modulation constellation has become a standard modulation constellation solution for a low-frequency short-range WLAN communication system in IEEE 802.11n/ac/ax and the like. In addition, the 11ay standard for the 60 GHz frequency band also becomes a mandatory modulation constellation solution. QAM is a technology of modulation combining amplitude and phase. It uses both the amplitude and phase of a carrier to transmit information bits. Therefore, higher frequency band utilization can be achieved when a minimum distance is the same. Transmission efficiency is higher when there are more QAM constellation points. In terms of demodulation, considering that standard rectangular QAM is equivalent to superposition of pulse amplitude modulation (PAM) on two orthogonal carriers, modulation and demodulation of the rectangular QAM are simple.

However, for high-order constellation modulation (for example, 1024QAM and 4096QAM), a non-linear factor (for example, phase noise) of system transmission severely affects transmission demodulation performance.

SUMMARY

In this application, an optimized non-uniform constellation is proposed for a non-linear factor (for example, phase noise) of system transmission, to improve overall throughput and performance of a WLAN system.

According to a first aspect, an embodiment of this application provides a modulation method, including:
  modulating data by using a non-uniform constellation; and
  sending the modulated data.

For an optimization criterion of the non-uniform constellation, refer to all technical details in (4) of the Description of Embodiments. For the non-uniform constellation, refer to all technical details in (5) of the Description of Embodiments.

When the non-uniform constellation provided in this embodiment is used, for each noise standard deviation, a BER of the non-uniform constellation provided in this embodiment is lower than a BER of an existing QAM constellation. In other words, for each noise standard deviation, BER performance of the non-uniform constellation provided in this embodiment is better than that of the existing QAM constellation, and a performance advantage is more obvious when residual phase noise standard deviation is larger.

In addition, according to the non-uniform constellation provided in this embodiment, when a receive end has a same residual phase noise standard deviation, an SNR required by the non-uniform constellation provided in this embodiment to achieve target spectral efficiency is closer to a Shannon limit value. In other words, as shown in FIG. 11 and FIG. 12, compared with a standard QAM constellation, an SNR required to achieve reliable transmission for a same phase noise standard deviation is lower.

According to a second aspect, an embodiment of this application provides a demodulation method, including:
  receiving air interface data; and
  demodulating the air interface data based on a non-uniform constellation.

For an optimization criterion of the non-uniform constellation, refer to all technical details in (4) of the Description of Embodiments. For the non-uniform constellation, refer to all technical details in (5) of the Description of Embodiments.

When the non-uniform constellation provided in this embodiment is used, for each noise standard deviation, a BER of the non-uniform constellation provided in this embodiment is lower than a BER of an existing QAM constellation. In other words, for each noise standard deviation, BER performance of the non-uniform constellation provided in this embodiment is better than that of the existing QAM constellation, and a performance advantage is more obvious when residual phase noise standard deviation is larger.

In addition, according to the non-uniform constellation provided in this embodiment, when a receive end has a same residual phase noise standard deviation, an SNR required by the non-uniform constellation provided in this embodiment to achieve target spectral efficiency is closer to a Shannon limit value. In other words, as shown in FIG. 11 and FIG. 12, compared with a standard QAM constellation, an SNR required to achieve reliable transmission for a same phase noise standard deviation is lower.

According to a third aspect, an embodiment of this application provides a modulation apparatus, including a unit configured to perform the modulation method according to the first aspect.

According to a fourth aspect, an embodiment of this application provides a demodulation apparatus, including a unit configured to perform the demodulation method according to the second aspect.

According to a fifth aspect, an embodiment of this application provides a computer-readable storage medium, configured to store a computer program. The computer program includes instructions for performing the modulation method according to the first aspect.

According to a sixth aspect, an embodiment of this application provides a computer-readable storage medium, configured to store a computer program. The computer program includes instructions for performing the demodulation method according to the second aspect.

According to a seventh aspect, an embodiment of this application provides a computer program. The computer program includes instructions for performing the modulation method according to the first aspect.

According to an eighth aspect, an embodiment of this application provides a computer program. The computer program includes instructions for performing the demodulation method according to the second aspect.

BRIEF DESCRIPTION OF DRAWINGS

FIG. 2-1 is a standard 16QAM constellation adopted by a IEEE 802.11 standard;

FIG. 2-2 is a standard 64QAM constellation adopted by a IEEE 802.11 standard;

FIG. 5-1 is an example of a sending and receiving system defined by MI;

FIG. 5-2 is an example of a sending and receiving system defined by PMI;

DESCRIPTION OF EMBODIMENTS

The following describes the technical solutions in embodiments of this application with reference to the accompanying drawings in embodiments of this application.

(1)

First, terms and acronyms and abbreviations of the terms that may be used in embodiments of this application are described. For terms and acronyms and abbreviations that may be used in embodiments of this application, refer to the following table.

| Acronyms and Abbreviations | Full Name |
|---|---|
| WLAN | Wireless Local Area Network |
| OFDM | Orthogonal Frequency Division Multiplexing |
| QAM | Quadrature Amplitude Modulation |
| AWGN | Additive White Gaussian Noise |
| BER | Bit Error Rate |
| LDPC | Low-Density Parity-Check |
| NUC | Non-Uniform Constellation |
| SNR | Signal-to-Noise Ratio |
| MI | Mutual Information |
| PMI | Pragmatic Mutual Information |

(2)

The following describes communication systems to which embodiments of this application may be applied, for example, a Wi-Fi wireless communication system, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, another future evolved system, or various other wireless communication systems that use a radio access technology.

The communication system includes a network device and at least one terminal device located in a coverage area of the network device. The network device may provide communication coverage for a specific geographic area, and communicate with a terminal device located in the coverage area. The network device may be an access point AP in a Wi-Fi wireless communication system, a base station (base transceiver station, BTS) in a GSM system or a code division multiple access (CDMA) system, a NodeB (node B, NB) in a WCDMA system, an evolved NodeB (evolutional node B, eNB or eNodeB) in an LTE system, a radio controller in a cloud radio access network (CRAN), or may be a relay station, a vehicle-mounted device, a wearable device, a network side device in a future network, or the like. The terminal device may be mobile or fixed, and the terminal device may be a station (STA), an access terminal, user equipment (UE), a subscriber unit, a subscriber station, a mobile station, a mobile console, a remote station, a remote terminal, a mobile device, a user terminal, a wireless communication device, a user agent, a user apparatus, or the like.

Figure 1:
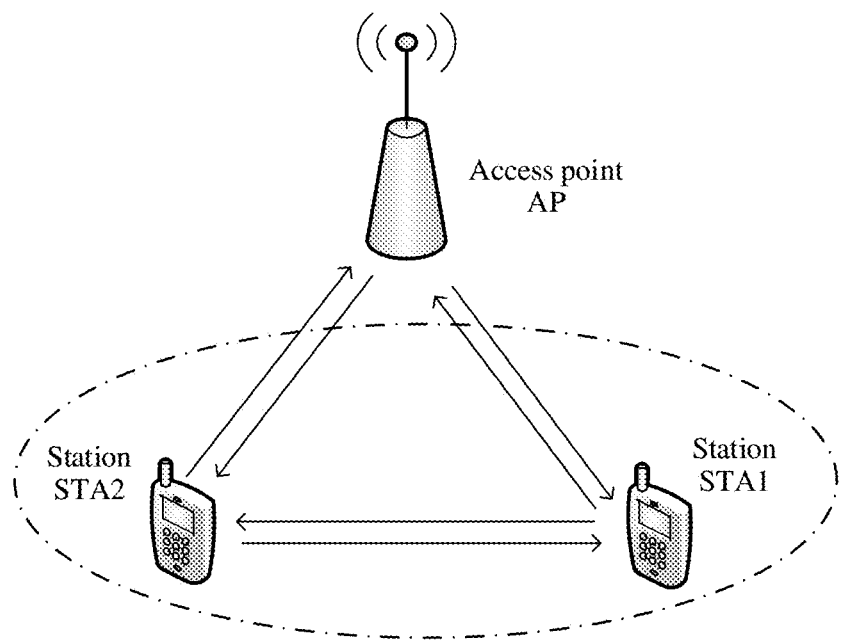
FIG. 1 shows a Wi-Fi wireless communication system.

FIG. 1 shows a Wi-Fi wireless communication system. As shown in FIG. 1, the network device is an access point (AP), the terminal device is a station (STA), and communication in the Wi-Fi wireless communication system includes uplink communication, downlink communication, D2D communication, and the like.

(3)

The following describes a background technology related to this application.

Figures 1, 2:
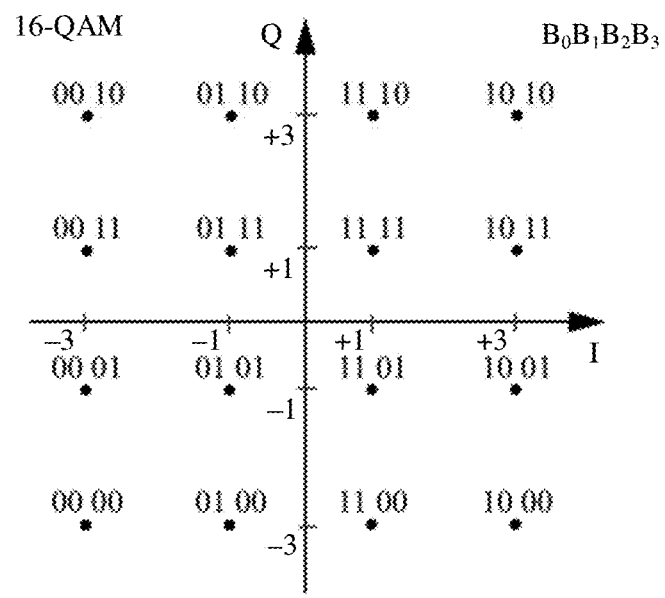
Figure 2:
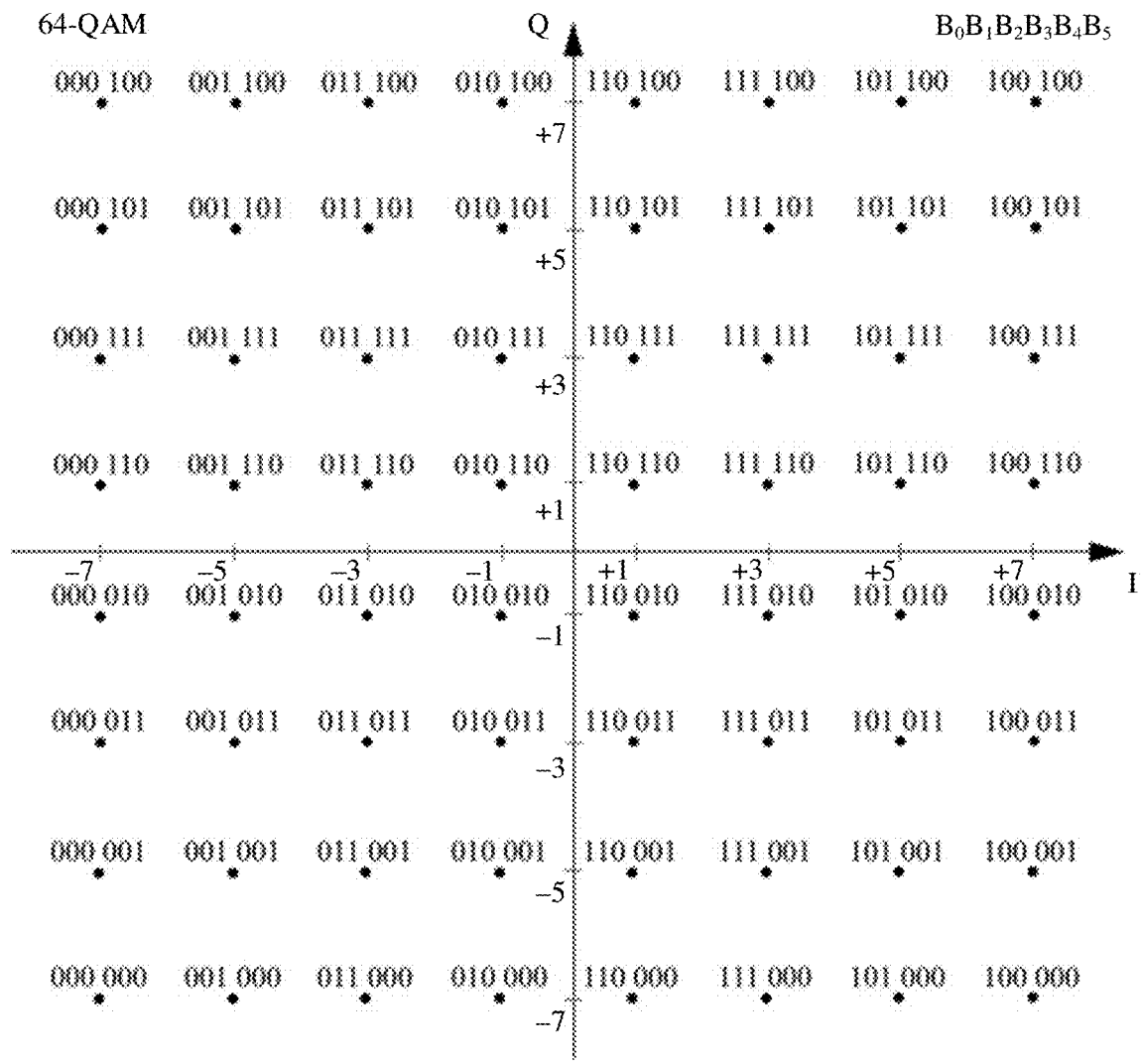

FIG. 2-1 and FIG. 2-2 are a standard 16QAM constellation and a 64QAM constellation and corresponding bit mapping. It can be seen that in QAM (quadrature amplitude modulation), a data signal is represented by an amplitude change of two carriers orthogonal to each other. In QAM, input bits are first mapped (usually by using Gray mapping) to a complex plane (constellation) to form a complex modulation symbol, and then amplitude modulation is performed on I and Q components (corresponding to real and imaginary parts of the complex plane, that is, horizontal and vertical directions) of the symbol. The modulation is correspondingly performed on the two carriers orthogonal to each other (orthogonal in time domain).

In terms of constellation mapping, as shown in the figure, standard QAM uses Gray mapping as a standard mapping rule. In addition, bit sets corresponding to two adjacent constellation points in the I and Q directions differ in only a single bit. Therefore, this facilitates unification. It should be noted that constellation mapping based on Gray code is not unique. In an example of 16QAM, FIG. 3 shows a 16QAM constellation and a schematic diagram of corresponding Gray mapping.

Figure 3:
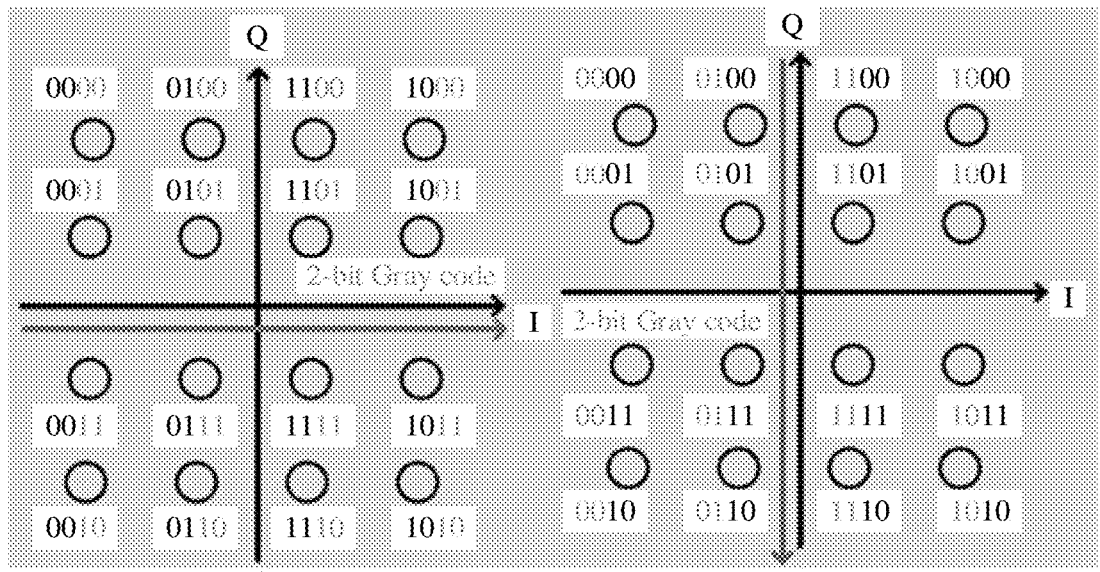
FIG. 3 is a schematic diagram of a 16QAM constellation and corresponding Gray mapping.
Figure 4:
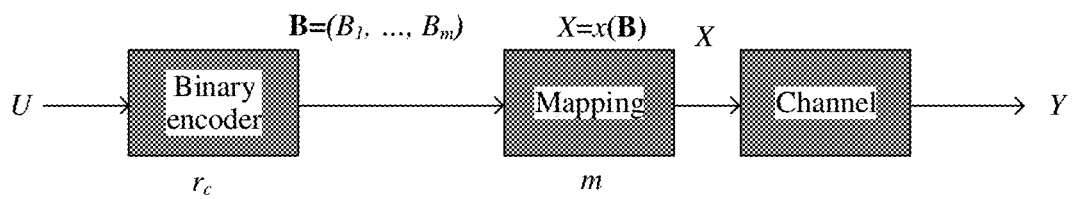
FIG. 4 shows a block diagram of system transmission and definition of mutual information.

It can be seen from FIG. 3 that Gray mapping is separately arranged on two constellations orthogonal to each other based on the Gray code. Specifically, different Gray mapping may be obtained based on an arrangement direction. For example, in the Gray mapping shown in FIG. 2, Gray codes are arranged from left to right on a real axis, and Gray codes are arranged from top to bottom on an imaginary axis. As shown in FIG. 2-1 and FIG. 2-2, Gray codes are arranged from left to right on a real axis, and Gray codes are arranged from bottom to top on an imaginary axis.

For n-bit binary codes, the bits are numbered from 0 to n−1 from right to left. One n-bit traditional binary code is denoted as $B_{n-1} \ldots B_1 B_0$, and one n-bit Gray code is denoted as $G_{n-1} \ldots G_1 G_0$. Conversion between the n-bit traditional binary code and the n-bit Gray code is as follows:

$$\begin{cases} G_{n-1} = B_{n-1} \\ G_i = B_i \oplus B_{i+1}, 0 \le i \le n-2 \end{cases}$$

For example, when n=3, a correspondence between 3-bit traditional binary codes and 3-bit Gray codes is shown as follows:

$$B_2 B_1 B_0 \quad 000 \quad 001 \quad 010 \quad 011 \quad 100 \quad 101 \quad 110 \quad 111 \qquad (4)$$
$$G_2 G_1 G_0 \quad 000 \quad 001 \quad 011 \quad 010 \quad 110 \quad 111 \quad 101 \quad 100$$

The following describes an optimization criterion and a method for optimizing a non-uniform constellation.

The non-uniform constellation may be generally classified into a 2-D NUC and a 1-D NUC. The 2-D NUC means that selections may be freely made in constellation space of the constellation without limitation. The 1-D NUC restricts that a real axis and an imaginary axis of the constellation are completely consistent. To be specific, constellation point distribution on the real axis may be separately designed, and constellation point distribution on the imaginary axis is the same. In other words, a non-uniform constellation arrangement on a single axis is used, and same arrangement is used on the real axis and the imaginary axis orthogonal to each other.

In embodiments of this application, an optimization criterion of a constellation is to maximize mutual information and pragmatic mutual information of a communication system, and impact of additive Gaussian noise and phase noise is considered in an optimization step.

A specific constellation is obtained through optimization, and real performance of the optimized constellation is also given based on an LDPC code.

The MI can be used to calculate an upper bound of maximum spectral efficiency of an actual system. Theoretical spectral efficiency is defined as $r=mr_c$ where ma is a quantity of binary bits corresponding to each modulation constellation point, and $r_c$ is a code rate of binary channel coding.

The MI is selected as the optimization criterion because the MI can provide more accurate performance predictions than other measures such as minimum Euclidean distance and bit error probability. For example, the MI can accurately predict a performance limit of channel coding that approaches a channel capacity, such as LDPC codes and serial or parallel Turbo codes that have been widely used in modern communication systems.

Figures 1, 5:
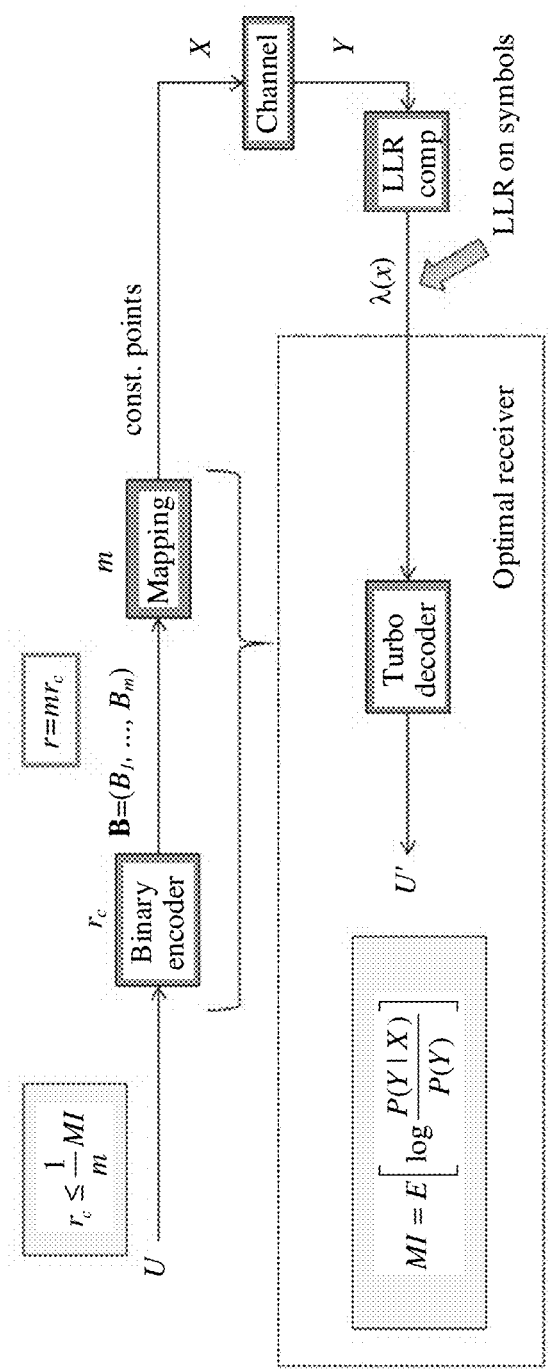
Figures 2, 5:
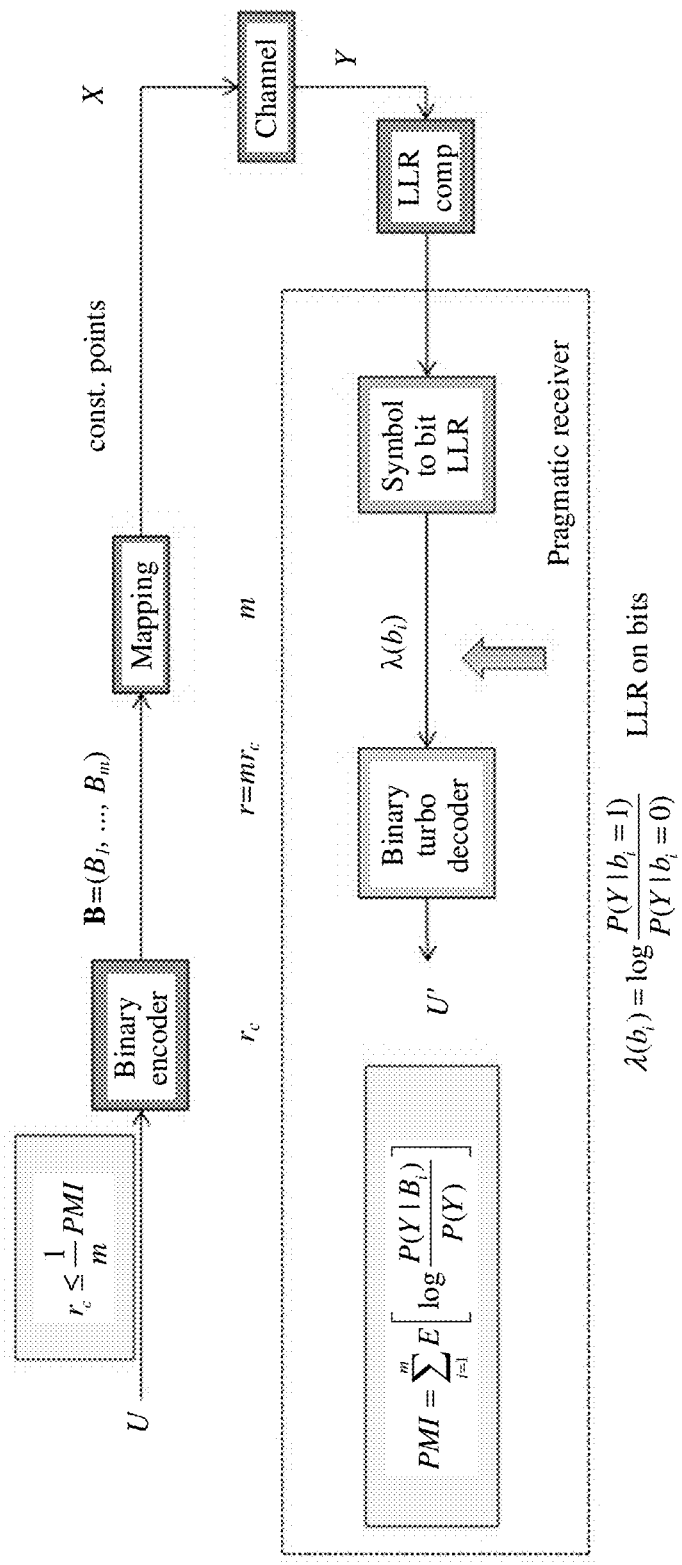

As shown in FIG. 5-1, the performance predicted by the MI assumes that the system does not convert a log-likelihood ratio (LLR) of a modulated symbol into an LLR of bits. It should be understood that a Turbo decoder in FIG. 5-1 is merely an example. The decoder herein may be any decoder, and is not limited to the Turbo decoder.

As shown in FIG. 5-2, the performance predicted by the PMI assumes that the system converts a log-likelihood ratio (LLR) of a modulated symbol into an LLR of bits. It should be understood that a Turbo decoder in FIG. 5-2 is merely an example. The decoder herein may be any decoder, and is not limited to the Turbo decoder.

In a system that does not convert a log-likelihood ratio (LLR) of a modulated symbol into an LLR of bits, a receiving structure in the system may be obtained in the following two manners;

adopting a properly designed non-binary encoder that matches the modulation constellation at a transmit end and a corresponding non-binary decoder at a receive end; or adding an iteration between a demodulator and a binary decoder, that is, adapting a channel decoder to the decoder, to obtain optimal performance. For example, an EXIT chart technology may be used together to design a binary encoder and a binary constellation mapping set.

A symbol LLR of a modulated symbol is converted into a corresponding bit LLR, and a decoder and a demodulator directly do not consider iteration. Such a pragmatic receiver may be widely referred to as a bit-interleaved coded modulation (BICM) system, and is widely used due to the following factors:

1. A binary channel encoder of the system can be designed independently of a modulation order, so that performance of a binary channel can be optimized.

2. A channel decoder can use a binary LLR to perform simpler decoding.

3. The system may be more flexible, and may be flexibly combined with an adaptive coding and modulation scheme, where a bit rate and a modulation order may flexibly adapt to a current channel condition.

For a specific constellation, mapping between bits and the constellation should be optimized to achieve better performance. Generally, optimal performance can be obtained by using Gray mapping. Although system models of the PMI and the MI are different, the difference between the two may be significantly reduced when an optimized constellation is used.

The MI and the PMI may be obtained through numerical calculation by using conditional probability P (Y|X) of a channel. If the channel is a memoryless channel, an output at a single time point is determined only by an input of the corresponding time point. Therefore, the calculation of the MI and the PMI in this case may be simplified. An actual memoryless AWGN channel may be expressed as follows:

$$Y = X + N \rightarrow P(Y|X) = \frac{1}{\pi N_0} \exp\left(-\frac{\|Y - X\|^2}{N_0}\right)$$

If white phase noise is added, $$Y = Xe^{j\theta} + N \rightarrow P(Y|X) = \frac{1}{\pi N_0} \int \exp\left(-\frac{\|Y - Xe^{j\theta}\|^2}{N_0}\right) f(\theta) d\theta$$

$f(\theta)$ represents a probability density function of the phase noise.

Specifically, the MI and the PMI may be calculated as follows:

$$MI = E\left[\log \frac{P(Y|X)}{P(Y)}\right]$$

$$PMI = \sum_{i=1}^{m} E\left[\log \frac{P(Y|B_i)}{P(Y)}\right]$$

An optimization framework in embodiments of this application is as follows:

Modulation order: When a designed modulation constellation has M points, a $\sqrt{M}$-point 1-D constellation is first obtained through optimization, and then the 1-D constellation points are respectively placed on a real axis and an imaginary axis that are orthogonal to obtain a complete constellation.

A channel coding rate is considered.

corresponding constellation and a corresponding binary mapping are designed for each constellation size and each possible residual phase noise level, to obtain $r=r_c m$ greater than target spectral efficiency with a minimum possible SNR as much as possible.

An overall process of optimizing a non-uniform constellation in embodiments of this application is as follows:

S1: Start from an arbitrary unidimensional (1-D) constellation (for example, a PAM constellation), and select an SNR, so that an obtained MI is greater than target spectral efficiency.

S2: Reduce the SNR and optimize the constellation until an obtained MI is greater than the target spectral efficiency again.

S3. If the optimization step cannot find a better constellation to achieve an MI greater than the target spectral efficiency, exit the process. Otherwise, return to step S2.

The foregoing step S2 relates to a step of searching for an optimal constellation. In embodiments of this application, a simulated annealing algorithm (SA, simulation annealing) is used, and an optimized solution for a multi-variable problem may be obtained by using the algorithm.

Specific steps of the SA algorithm are summarized in the following. The SA algorithm maximizes a target equation $f(x)$ (a target equation corresponding to an MI or a PMI), the variable space of the SA algorithm is a N-dimension vector $x=(x_1, \ldots, x_N)$, that is, the $\sqrt{M}$-dimension constellation points mentioned above, and a complete M modulation constellation is obtained by orthogonally placing the $\sqrt{M}$-dimension constellation points.

Initial steps of the SA algorithm in embodiments of this application are: randomly selecting an initial vector $x_0=x_F$, and evaluating a corresponding objective equation value $f(x_0)$ of the initial vector. It is assumed that $F=f(x_0)$. A specific SA iteration algorithm is as follows:

Loop on $F=f(x_0)$ ($n_N$ is maximum quantity of iterations of the SA algorithm)
(a) set a temperature parameter based on a selected cooling function $t_n=C(n)$ (non-increasing function);
(b) randomly perturb the vector $x_n=n_{n-1}+\Delta(t_n)$, and evaluate an objective function value $f(x)$;
(c) if $f(x_n)>F$, set $F=f(x_n)$ R and save $x_F=x_n$; and
(d) if $f(x_n)\leq F$, accept a current result with a probability $e^{(f(x_n)-F)/t_n}$; otherwise, undo perturbation, that is, $x_n=x_{n-1}$;

Go to step b);

Return a vector $x_F$ finally obtained through optimization, that is, a corresponding objective function value F.

It should be noted that different SA algorithms may be obtained based on different cooling functions $t_n=C(n)$ and random perturbation functions $\Delta(t_n)$. The following cooling functions are considered:

Logarithmic cooling function:

$$t_n = \frac{2}{\log(n+1)} \to$$

the cooling function converges slowly, but a globally optimal solution can be obtained under some conditions of the objective function;

Exponential cooling function: $t_n=a^n 0<\alpha-1\to$the cooling function converges quickly, but only a locally optimal solution can be obtained;

Polynomial cooling function: $t_n=n^\alpha$ $\alpha<0\to$the cooling function is of intermediate effect between the first two functions.

In embodiments of this application, the polynomial cooling function is selected for the SA algorithm, and a selection range of a parameter $\alpha$ is from −0.4 to −0.6. The random perturbation function $\Delta(t_n)$ is performed by selecting a uniformly random element of the vector x, and randomly moving the element in an interval based on a current temperature:

$$x_R \leftarrow x_R+D_0 t_n 2(U-0.5)$$

R is a discrete random variable uniformly distributed in $[1, \ldots, N]$, and U is a random variable uniformly distributed in $[0,1]$. $D_0$ is a maximum value of the random perturbation movement, and values of random perturbation are uniformly distributed in $[-D_0 \cdot t_n/2, D_0 \cdot t_n/2]$. It can be learned that the random perturbation gradually approaches 0 with the temperature $t_n=D_0=1$ is set in embodiments of this application. (5)

The following describes in detail a modulation method provided in embodiments of this application, and in particular, describes a non-uniform constellation obtained by using the foregoing optimization criterion.

An embodiment of this application provides a modulation method, including:

S10: Modulating data by using a non-uniform constellation.

In S10, based on the foregoing optimization criterion for a non-uniform constellation, this embodiment provides the following non-uniform constellations.

1. 1-D 64-point constellation

Figure 7:
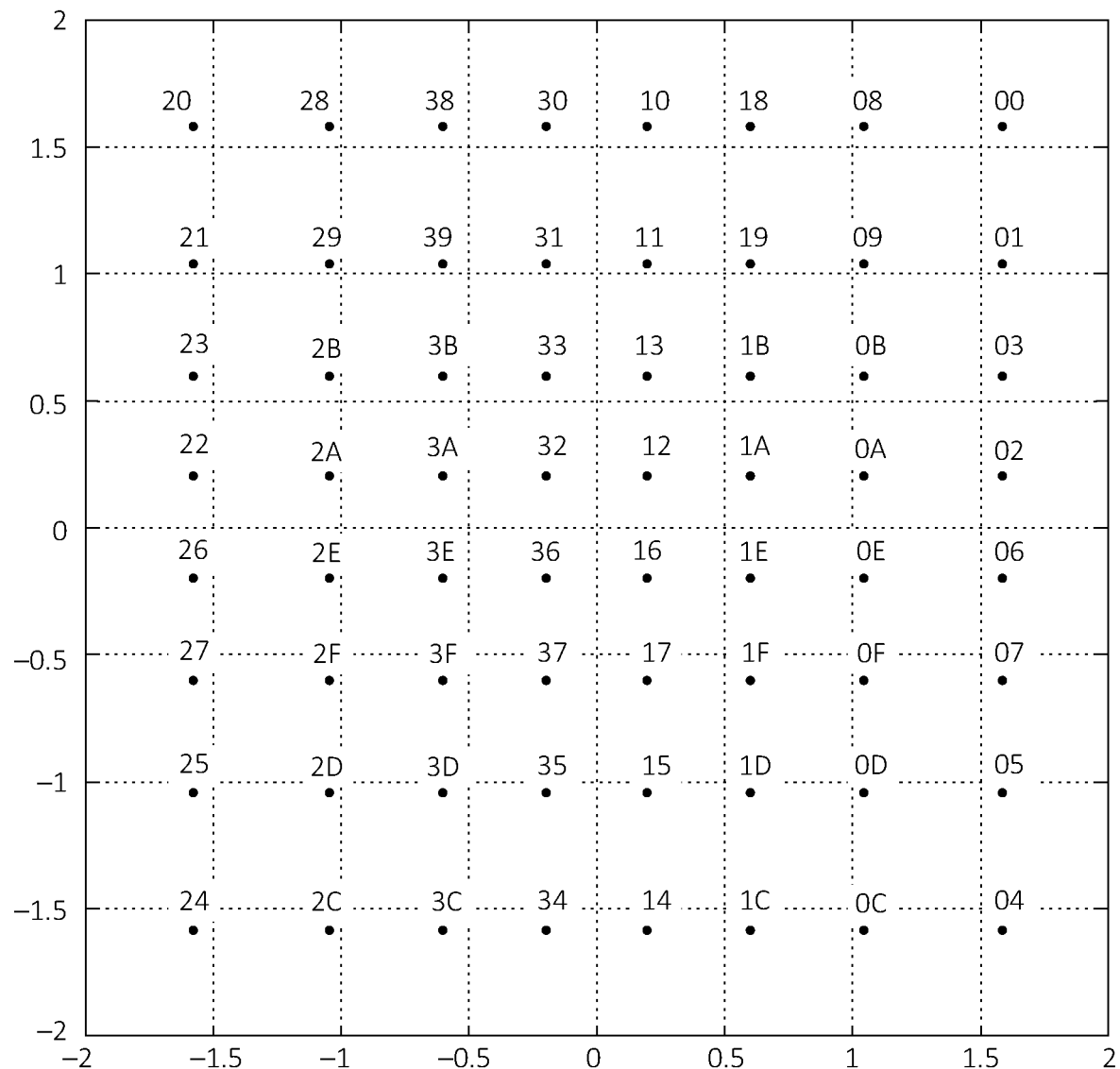
FIG. 7 is a 1-D 64-point constellation according to the present invention.

A 1-D 64-point constellation provided in this embodiment is shown in FIG. 7.

(1) Coordinates of Constellation Points on a Real Axis, as Shown Below:

−1.581976
−1.045993
−0.603157
−0.198626
0.198626
0.603157
1.045993
1.581976

As described above, in a 1-D NUC, constellation point distribution on an imaginary axis is the same as that on a real axis. Therefore, coordinates of the constellation points on the imaginary axis are also shown as below:
−1.581976
−1.045993
−0.603157
−0.198626
0.198626
0.603157
1.045993
1.581976

The eight coordinate positions on the real axis and the eight coordinate positions on the imaginary axis jointly form the 1-D 64-point constellation shown in FIG. 7. For example, in FIG. 7, a position of a constellation point (24) at a lower left corner is (−1.581976, −1.581976).

It should be noted that any constellation with coordinate positions roughly conforming to the foregoing coordinates, for example, coordinates obtained with X decimal places directly shown based on the foregoing coordinates, or coordinates obtained through rounding to X decimal places, is the NUC to be protected in this embodiment. X may be 1, 2, 3, 4, 5, or 6.

It should be further noted that any NUC formed by coordinates proportional to the foregoing coordinate positions is the NUC to be protected in this embodiment. For example, all the foregoing coordinates are multiplied by a, and a is any real number that is not equal to 0.

(2) Gray Codes Corresponding to the Constellation Points

A group of Gray codes corresponding to constellation points in the constellation shown in FIG. 7 are 000, 001, 011, 010, 110, 111, 101, 100.

It should be understood that constellation points in the constellation may alternatively correspond to other Gray codes. For example, constellation points in the constellation correspond to another group of Gray codes: 011, 010, 110, 111, 101, 100, 000, 001. The Gray codes corresponding to constellation points in a constellation are merely used to distinguish between different points. Specific Gray codes corresponding to the constellation points in the constellation are not limited in this embodiment.

(3) Mapping Arrangement Modes of Gray Code Mapping

The Gray codes are mapped on the real axis and the imaginary axis separately. Therefore, there are four mapping arrangement modes of Gray code mapping in the constellation:
(a) real axis: from left to right; imaginary axis: from bottom to top;
(b) real axis: from left to right; imaginary axis: from top to bottom;
(c) real axis: from right to left; imaginary axis: from top to bottom; and
(d) real axis: from right to left; imaginary axis: from bottom to top.

For example, a group of Gray codes 000, 001, 011, 010, 110, 111, 101, 100. If the mapping arrangement mode (c) is used, codes corresponding to constellation points in FIG. 7 on the real axis are 000, 001, 011, 010, 110, 111, 101, 100 from right to left, and codes corresponding to constellation points on the imaginary axis are 000, 001, 011, 010, 110, 111, 101, 100 from top to bottom.

The constellation point in the lower left corner in FIG. 7 corresponds to the code 100 on the real axis, and corresponds to the code 100 on the imaginary axis. Therefore, the code corresponding to the constellation point in the lower left corner in FIG. 7 is 100100, and 100100 is represented as 24 in hexadecimal notation.

The constellation point in the lower right corner in FIG. 7 corresponds to the code 000 on the real axis, and corresponds to the code 100 on the imaginary axis. Therefore, the code corresponding to the constellation point in the lower left corner in FIG. 7 is 000100, and 000100 is represented as 04 in hexadecimal notation.

The constellation point in the upper left corner in FIG. 7 corresponds to the code 100 on the real axis, and corresponds to the code 000 on the imaginary axis. Therefore, the code corresponding to the constellation point in the upper left corner in FIG. 7 is 100000, and 100000 is represented as 20 in hexadecimal notation.

The constellation point in the upper right corner in FIG. 7 corresponds to the code 000 on the real axis, and corresponds to the code 000 on the imaginary axis. Therefore, the code corresponding to the constellation point in the upper right corner in FIG. 7 is 000000, and 000000 is represented as 00 in hexadecimal notation.

2. 1-D 256-Point Constellation

Figure 8:
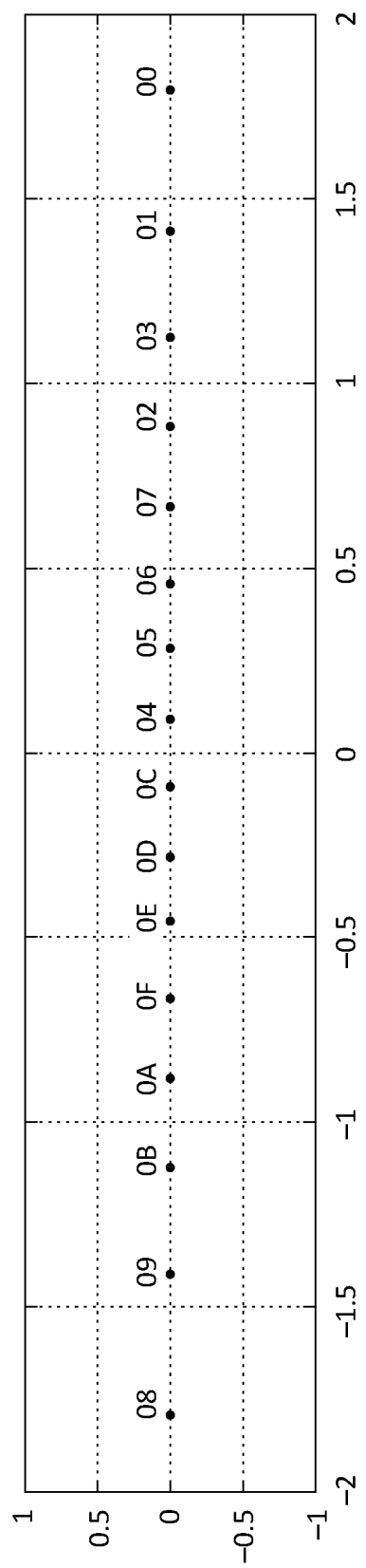
FIG. 8 is a 1-D 256-point constellation according to the present invention.

A 1-D 256-point constellation provided in this embodiment is shown in FIG. 8. FIG. 8 provides only an example of unidimensional mapping. A mapping mode of a specific complete constellation is the same as an expansion mode of the foregoing 1-D 64-point constellation, that is, an imaginary axis uses a same constellation point coordinate distribution as a real axis. Therefore, coordinates of the specific complete constellation on the imaginary axis are the same as coordinates of the constellation on the real axis.

(1) Coordinates of Constellation Points on the Real Axis, as Shown Below:
−1.795059
−1.412292
−0.882753
−1.125589
−0.089588
−0.283139
−0.663258
−0.457043
0.457043
0.663258
0.283139
0.089588
1.125589
0.882753
1.412292
1.795059

As described above, in a 1-D NUC, constellation point distribution on an imaginary axis is the same as that on a real axis. Therefore, coordinates of the constellation points on the imaginary axis are also shown as below:
−1.795059
−1.412292
−0.882753
−1.125589
−0.089588
−0.283139
−0.663258
−0.457043
0.457043
0.663258
0.283139
0.089588
1.125589
0.882753
1.412292
1.795059

The 16 coordinate positions on the real axis and the 16 coordinate positions on the imaginary axis jointly form the 1-D 256-point constellation. It may be understood that a position of the constellation point in the lower left corner of the 1-D 256-point constellation is (−1.795059, −1.795059).

It should be noted that any constellation with coordinate positions roughly conforming to the foregoing coordinates, for example, coordinates obtained with X decimal places directly shown based on the foregoing coordinates, or coordinates obtained through rounding to X decimal places, is the NUC to be protected in this embodiment. X may be 1, 2, 3, 4, 5, or 6.

It should be further noted that any NUC formed by coordinates proportional to the foregoing coordinate positions is the NUC to be protected in this embodiment. For example, all the foregoing coordinates are multiplied by $\alpha$, and $\alpha$ is any real number that is not equal to 0.

(2) Gray Codes Corresponding to the Constellation Points

A group of Gray codes corresponding to constellation points in the 1-D 256-point constellation are 0000, 0001, 0011, 0010, 0110, 0111, 0101, 0100, 1100, 1101, 1111, 1110, 1010, 1011, 1001, 1000.

As described above, the Gray codes corresponding to constellation points in a constellation are merely used to distinguish between different constellation points. Specific Gray codes corresponding to the constellation points in the constellation are not limited in this embodiment.

(3) Mapping Arrangement Modes of Gray Code Mapping

The Gray codes are mapped on the real axis and the imaginary axis separately. Therefore, there are four mapping arrangement modes of Gray code mapping in the constellation:

(a) real axis: from left to right; imaginary axis: from bottom to top;
(b) real axis: from left to right; imaginary axis: from top to bottom;
(c) real axis: from right to left; imaginary axis: from top to bottom;
(d) real axis: from right to left; imaginary axis: from bottom to top.

For example, a group of Gray codes are 0000, 0001, 0011, 0010, 0110, 0111, 0101, 0100, 1100, 1101, 1111, 1110, 1010, 1011, 1001, 1000. If the mapping arrangement mode (a) is used, codes corresponding to constellation points in FIG. 8 on the real axis are 0000, 0001, 0011, 0010, 0110, 0111, 0101, 0100, 1100, 1101, 1111, 1110, 1010, 1011, 1001, 1000 from left to right, and codes corresponding to constellation points on the imaginary axis are 0000, 0001, 0011, 0010, 0110, 0111, 0101, 0100, 1100, 1101, 1111, 1110, 1010, 1011, 1001, 1000 from bottom to top.

The constellation point in the upper left corner in the 1-D 256-point constellation corresponds to the code 0000 on the real axis, and corresponds to the code 1000 on the imaginary axis. Therefore, the code corresponding to the constellation point in the upper left corner in the 1-D 256-point constellation is 00001000, and 00001000 is represented as 08 in hexadecimal notation.

3. 1-D 1024-Point Constellation

Figure 9:
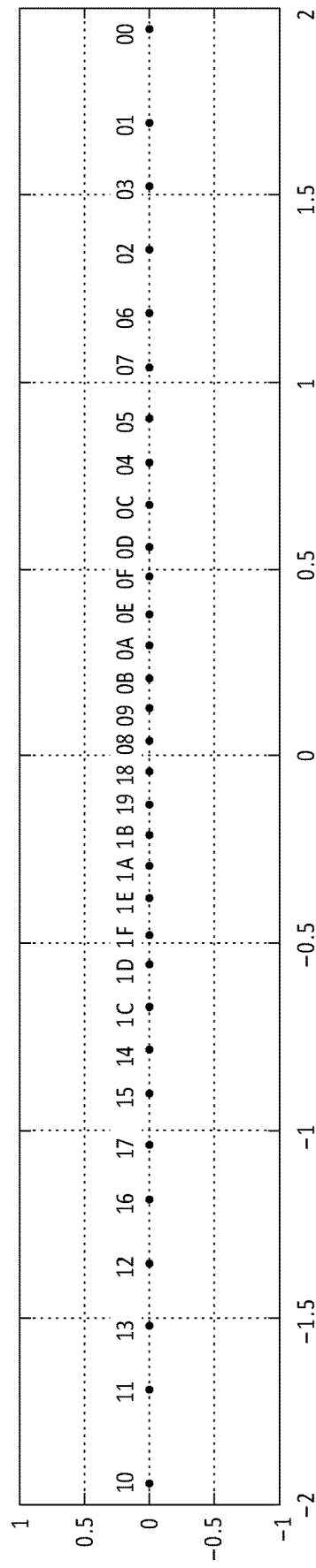
FIG. 9 is a 1-D 1024-point constellation according to the present invention.

A 1-D 1024-point constellation provided in this embodiment is shown in FIG. 9. FIG. 9 provides only an example of unidimensional mapping. A mapping mode of a specific complete constellation is the same as an expansion mode of the foregoing 1-D 64-point constellation, that is, an imaginary axis uses a same constellation point coordinate distribution as a real axis. Therefore, coordinates of the specific complete constellation on the imaginary axis are the same as coordinates of the constellation on the real axis.

(1) Coordinates of Constellation Points on a Real Axis, as Shown Below:

1.941833
1.693122
1.355517
1.524286
0.784606
0.903175
1.185644
1.040121
0.042179
0.129644
0.295250
0.208995
0.670939
0.557285
0.379156
0.478424
−1.941833
−1.693122
−1.355517
−1.524286
−0.784606
−0.903175
−1.185644
−1.040121
−0.042179
−0.129644
−0.295250
−0.208995
−0.670939
−0.557285
−0.379156
−0.478424

As described above, in a 1-D NUC, constellation point distribution on an imaginary axis is the same as that on a real axis. Therefore, coordinates of the constellation points on the imaginary axis are also shown as below:

1.941833
1.693122
1.355517
1.524286
0.784606
0.903175
1.185644
1.040121
0.042179
0.129644
0.295250
0.208995
0.670939
0.557285
0.379156
0.478424
−1.941833
−1.693122
−1.355517
−1.524286
−0.784606
−0.903175
−1.185644
−1.040121
−0.042179
−0.129644
−0.295250
−0.208995
−0.670939

−0.557285
−0.379156
−0.478424

The 32 coordinate positions on the real axis and the 32 coordinate positions on the imaginary axis jointly form the 1-D 1024-point constellation. It may be understood that a position of the constellation point in the lower left corner of the 1-D 1024-point constellation is (−1.941833, −1.941833).

It should be noted that any constellation with coordinate positions roughly conforming to the foregoing coordinates, for example, coordinates obtained with X decimal places directly shown based on the foregoing coordinates, or coordinates obtained through rounding to X decimal places, is the NUC to be protected in this embodiment. X may be 1, 2, 3, 4, 5, or 6.

It should be further noted that any NUC formed by coordinates proportional to the foregoing coordinate positions is the NUC to be protected in this embodiment. For example, all the foregoing coordinates are multiplied by α, and α is any real number that is not equal to 0.

(2) Gray Codes Corresponding to the Constellation Points

The constellation points in the 1-D 1024-point constellation correspond to a group of 5-bit Gray codes on the real axis, and correspond to the 5-bit Gray codes on the imaginary axis too.

It should be understood that the 5-bit Gray codes may be generated in the Gray code generation manner described in (3), and the 5-bit Gray codes are not specifically described herein.

It should be understood that Gray codes corresponding to constellation points in a constellation are merely used to distinguish between different constellation points. Specific Gray codes corresponding to the constellation points in the constellation are not limited in this embodiment.

(3) Mapping Arrangement Modes of Gray Code Mapping

The Gray codes are mapped on the real axis and the imaginary axis separately. Therefore, there are four mapping arrangement modes of Gray code mapping in the constellation:

(a) real axis: from left to right; imaginary axis: from bottom to top;
(b) real axis: from left to right; imaginary axis: from top to bottom;
(c) real axis: from right to left; imaginary axis: from top to bottom;
(d) real axis: from right to left; imaginary axis: from bottom to top.

It should be understood that any group of Gray codes may be mapped for each constellation point in the constellation in any one of the foregoing mapping arrangement modes. For example, if the mode (a) is used, the 5-bit Gray codes may be generated in the Gray code generation manner described in (3), and Gray codes corresponding to the constellation point in the lower left corner of the 1-D 1024-point constellation are (00000, 00000).

4. 1-D 4096-Point Constellation

Figure 10:
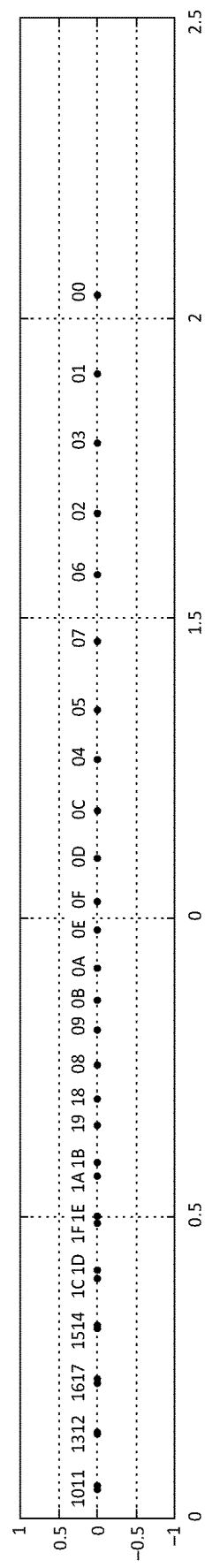
FIG. 10 is a 1-D 4096-point constellation according to the present invention.
Figure 11:
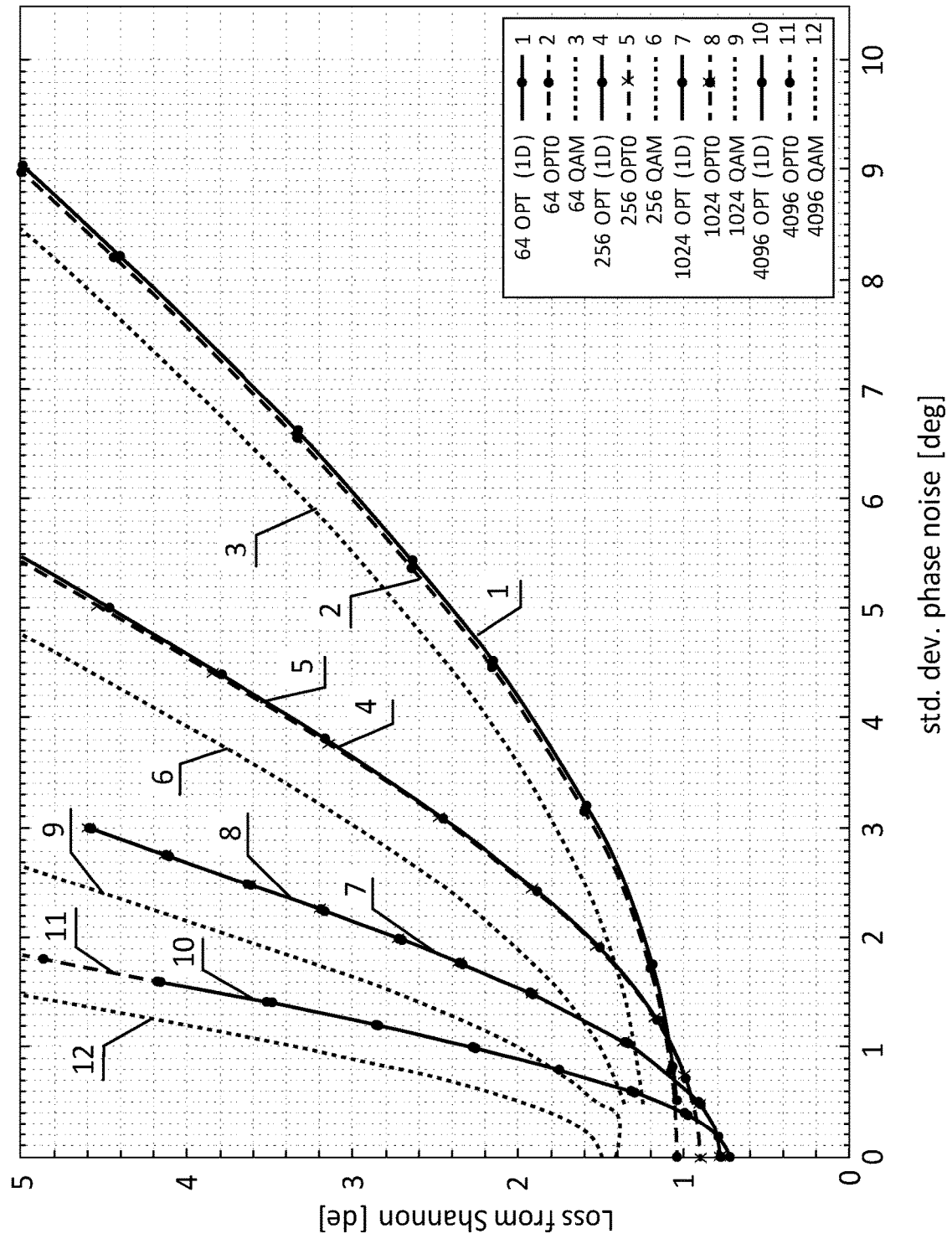
FIG. 11 is a technical effect diagram of the present invention.
Figure 12:
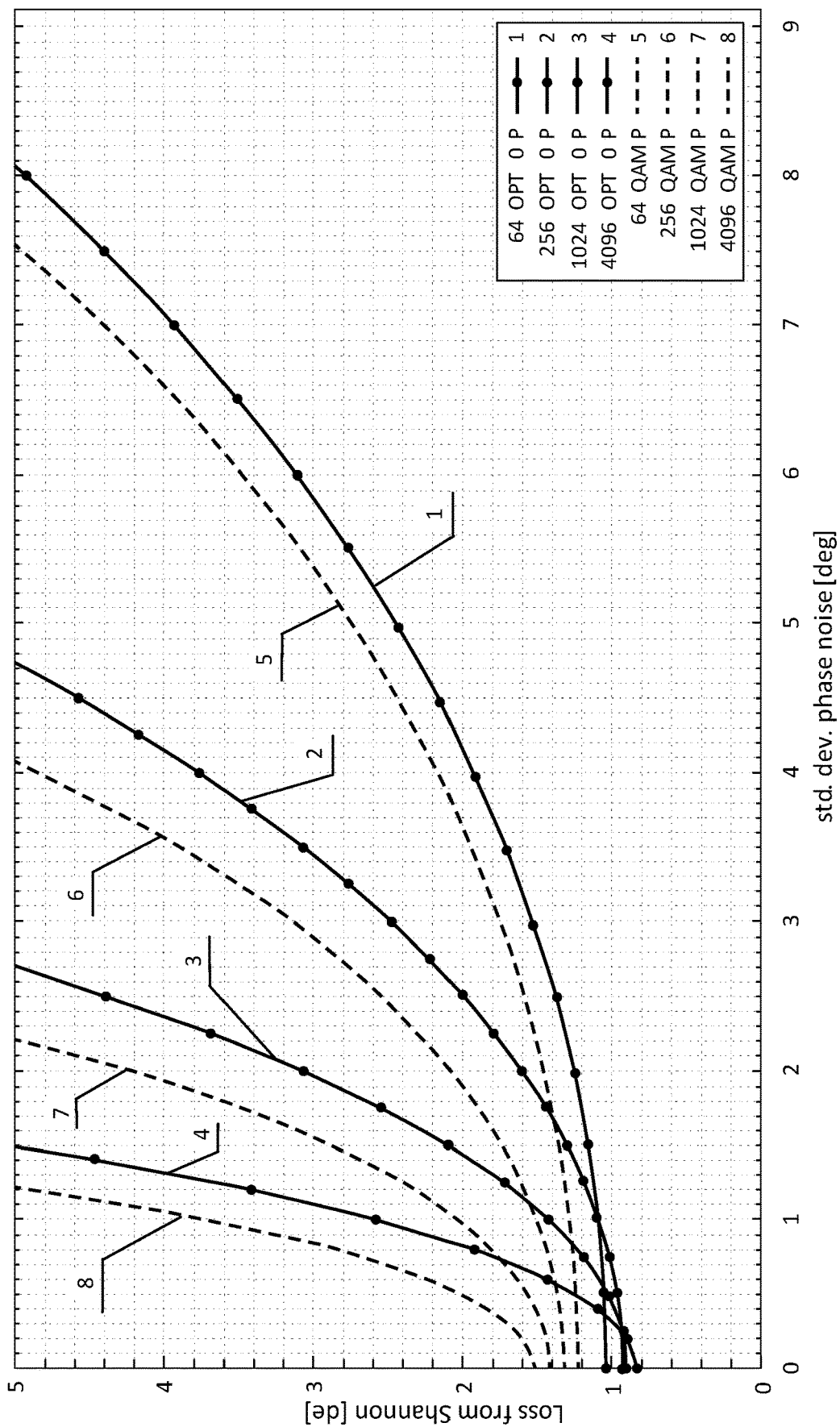
FIG. 12 is another technical effect diagram of the present invention.

A 1-D 4096-point constellation provided in this embodiment is shown in FIG. 10. FIG. 10 provides only an example of unidimensional mapping. A mapping mode of a specific complete constellation is the same as an expansion mode of the foregoing 1-D 64-point constellation, that is, an imaginary axis uses a same constellation point coordinate distribution as a real axis. Therefore, coordinates of the specific complete constellation on the imaginary axis are the same as coordinates of the constellation on the real axis.

(1) Coordinates of Constellation Points on a Real Axis, as Shown Below:

2.038418
1.906150
1.673531
1.791411
1.263222
1.345497
1.572115
1.461245
0.754046
0.813916
0.915804
0.863190
1.177789
1.099763
0.979362
1.026466
0.046434
0.052468
0.141902
0.138874
0.319658
0.316081
0.223953
0.232252
0.697716
0.654974
0.569488
0.591522
0.398584
0.413151
0.502350
0.491908
−2.038418
−1.906150
−1.673531
−1.791411
−1.263222
−1.345497
−1.572115
−1.461245
−0.754046
−0.813916
−0.915804
−0.863190
−1.177789
−1.099763
−0.979362
−1.026466
−0.046434
−0.052468
−0.141902
−0.138874
−0.319658
−0.316081
−0.223953
−0.232252
−0.697716
−0.654974
−0.569488
−0.591522
−0.398584
−0.413151
−0.502350
−0.491908

As described above, in a 1-D NUC, constellation point distribution on an imaginary axis is the same as that on a real axis. Therefore, coordinates of the constellation points on the imaginary axis are also shown as below:

2.038418
1.906150
1.673531
1.791411
1.263222
1.345497
1.572115
1.461245
0.754046
0.813916
0.915804
0.863190
1.177789
1.099763
0.979362
1.026466
0.046434
0.052468
0.141902
0.138874
0.319658
0.316081
0.223953
0.232252
0.697716
0.654974
0.569488
0.591522
0.398584
0.413151
0.502350
0.491908
−2.038418
−1.906150
−1.673531
−1.791411
−1.263222
−1.345497
−1.572115
−1.461245
−0.754046
−0.813916
−0.915804
−0.863190
−1.177789
−1.099763
−0.979362
−1.026466
−0.046434
−0.052468
−0.141902
−0.138874
−0.319658
−0.316081
−0.223953
−0.232252
−0.697716
−0.654974
−0.569488
−0.591522
−0.398584
−0.413151
−0.502350
−0.491908

The 64 coordinate positions on the real axis and the 64 coordinate positions on the imaginary axis jointly form the 1-D 4096-point constellation. It may be understood that a position of the constellation point in the lower left corner of the 1-D 4096-point constellation is (−2.038418, −2.038418).

It should be noted that any constellation with coordinate positions roughly conforming to the foregoing coordinates, for example, coordinates obtained with X decimal places directly shown based on the foregoing coordinates, or coordinates obtained through rounding to X decimal places, is the NUC to be protected in this embodiment. X may be 1, 2, 3, 4, 5, or 6.

It should be further noted that any NUC formed by coordinates proportional to the foregoing coordinate positions is the NUC to be protected in this embodiment. For example, all the foregoing coordinates are multiplied by α, and α is any real number that is not equal to 0.

(2) Gray Codes Corresponding to the Constellation Points

The constellation points in the 1-D 4096-point constellation correspond to a group of 6-bit Gray codes on the real axis, and correspond to the 6-bit Gray codes on the imaginary axis too.

It should be understood that the 6-bit Gray codes may be generated in the Gray code generation manner described in (3), and the 6-bit Gray codes are not specifically described herein.

It should be understood that Gray codes corresponding to constellation points in a constellation are merely used to distinguish between different constellation points. Specific Gray codes corresponding to the constellation points in the constellation are not limited in this embodiment.

(3) Mapping Arrangement Modes of Gray Code Mapping

The Gray codes are mapped on the real axis and the imaginary axis separately. Therefore, there are four mapping arrangement modes of Gray code mapping in the constellation:
 (a) real axis: from left to right; imaginary axis: from bottom to top;
 (b) real axis: from left to right; imaginary axis: from top to bottom;
 (c) real axis: from right to left; imaginary axis: from top to bottom;
 (d) real axis: from right to left; imaginary axis: from bottom to top.

It should be understood that any group of Gray codes may be mapped for each constellation point in the constellation in any one of the foregoing mapping arrangement modes. For example, if the mode (a) is used, the 6-bit Gray codes may be generated in the Gray code generation manner described in (3), and Gray codes corresponding to the constellation point in the lower left corner of the 1-D 4096-point constellation are (000000, 000000).

Figure 6:
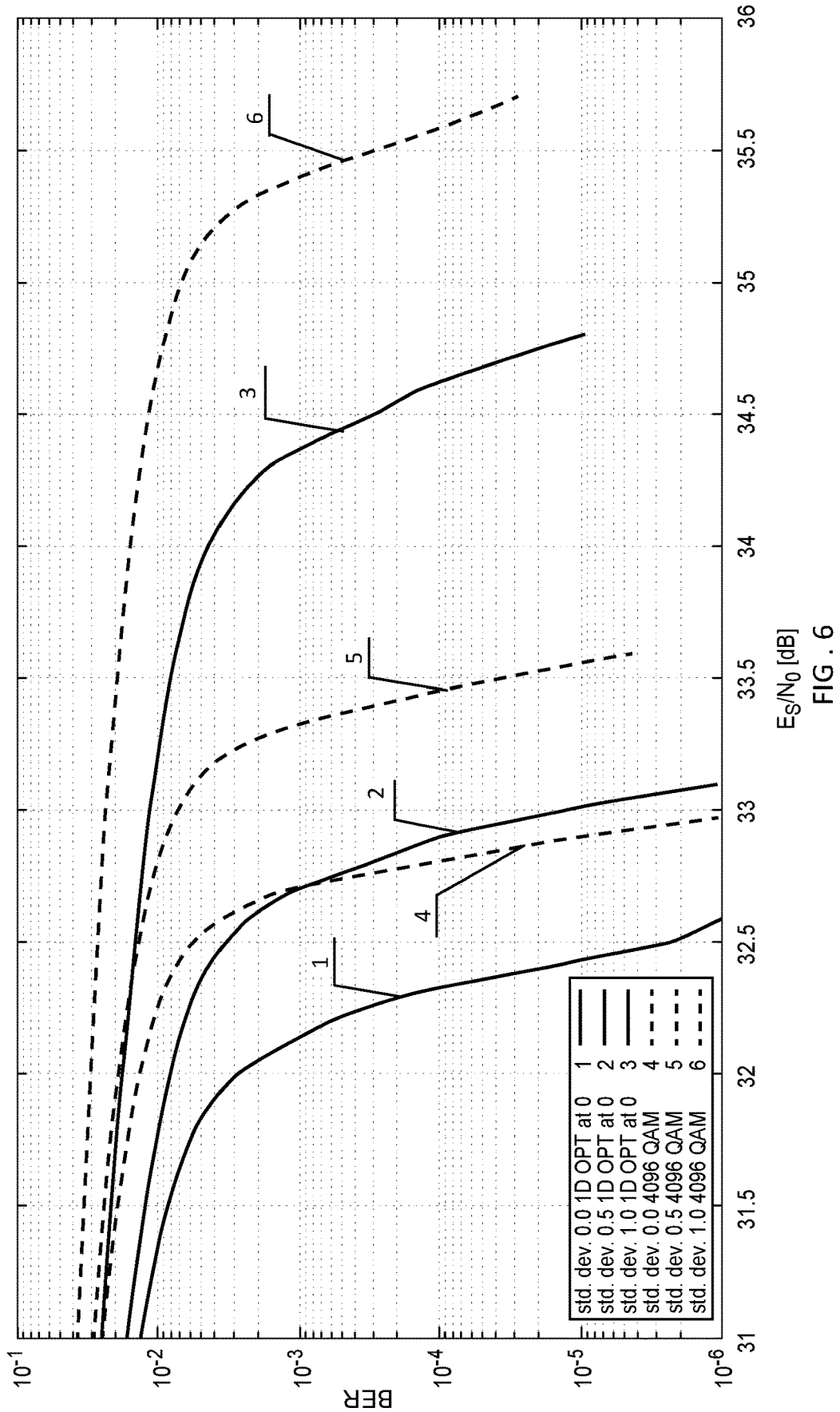
FIG. 6 shows a minimum free distance at each bit rate in the solution of the present invention.

FIG. 6 shows comparison of BER simulation performance between the 1-D NUC 4096-point constellation of the present invention and an existing 4096QAM system, where a DVB LDPC code with a code length of 64800 bits and a code rate of 4/5 is used for channel coding. Three types of residual phase noise are used in the simulation, that is, standard deviations of the residual phase noise are 0 degrees, 0.5 degrees, and 1 degree respectively. As shown in the figure, for each noise standard deviation, a BER of the 1-D NUC 4096 constellation in the present invention is lower than that of the existing QAM constellation. In other words, for each noise standard deviation, BER performance of the 1-D NUC 4096 constellation in the present invention is better than that of the existing QAM constellation, and a performance advantage is more obvious when residual phase noise standard deviation is larger.

S20: Sending the modulated data.

In S20, when modulation constellation points are transmitted, a normalization operation is generally performed on transmitting amplitude, that is, complex numbers corresponding to all constellation points are multiplied by a same normalization coefficient $\beta$. It is assumed that coordinates of a constellation point $U_i$ (=1, ..., M) are $(X_i, Y_i)$, where M is a quantity of constellation points in the modulation constellation. A complex number corresponding to the constellation point $U_i$, is $X_i+jY_i$. The normalization factor may be obtained through calculation according to the following formula:

$$\beta = \sqrt{\frac{1}{\frac{1}{M}\sum_{i=1}^{M}(X_i^2 + Y_i^2)}}$$

If the scale coefficient $\alpha$ of the constellation mentioned above is considered in the formula, the normalization factor is:

$$\beta = \sqrt{\frac{1}{\frac{a^2}{M}\sum_{i=1}^{M}(X_i^2 + Y_i^2)}}$$

The formula is applicable to all modulation constellations mentioned below.

It should be understood that S20 in this embodiment is an optional step.

(6)

An embodiment of this application further provides a demodulation method. The following describes in detail the demodulation method provided in this embodiment.

An embodiment of this application provides a demodulation method, including:

S40: Receive air interface data.

S50: Demodulate the air interface data based on a non-uniform constellation.

In S50, for an optimization criterion of the non-uniform constellation, refer to all technical details in the foregoing (4). For the non-uniform constellation, refer to all technical details in the foregoing (5). Details are not described herein again.

(7)

The foregoing describes the modulation method and the demodulation method provided in embodiments of this application. The following describes a product in embodiments of this application.

An embodiment of this application provides a modulation apparatus, including:

a processing unit, configured to modulate data by using a non-uniform constellation. For an optimization criterion of the non-uniform constellation, refer to all technical details in the foregoing (4). For the non-uniform constellation, refer to all technical details in the foregoing (5). Details are not described herein again.

Optionally, the modulation apparatus further includes:

a sending unit, configured to send the modulated data.

According to the modulation apparatus provided in this embodiment, transmission demodulation performance better than that of conventional QAM can be obtained, and overall throughput and performance of a WLAN system can be improved.

An embodiment of this application further provides a demodulation apparatus, including:

a receiving unit, configured to receive air interface data; and a processing unit, configured to demodulate the air interface data based on a non-uniform constellation. For an optimization criterion of the non-uniform constellation, refer to all technical details in the foregoing (4). For the non-uniform constellation, refer to all technical details in the foregoing (5). Details are not described herein again.

The foregoing describes the modulation apparatus and the demodulation apparatus in embodiments of this application. The following describes possible product forms of the modulation apparatus and the demodulation apparatus. It should be understood that any product in any form that has a function of the foregoing modulation apparatus and any product in any form that has a function of the foregoing demodulation apparatus shall fall within the protection scope of embodiments of this application. It should be further understood that the following description is merely an example, and does not limit a product form of the modulation apparatus and the demodulation apparatus in embodiments of this application.

In a possible product form, the modulation apparatus or the demodulation apparatus in embodiments of this application may be implemented by using a general bus architecture.

The modulation apparatus includes a processor and a transceiver that is internally connected to and communicates with the processor. The processor is configured to modulate data by using a non-uniform constellation. For an optimization criterion of the non-uniform constellation, refer to all technical details in the foregoing (4). For the non-uniform constellation, refer to all technical details in the foregoing (5). The transceiver is configured to send the modulated data. Optionally, the modulation apparatus may further include a memory. The memory is configured to store instructions executed by the processor.

The demodulation apparatus includes a processor and a transceiver that is internally connected to and communicates with the processor. The transceiver is configured to receive air interface data, and the processor is configured to demodulate the air interface data based on a non-uniform constellation. For an optimization criterion of the non-uniform constellation, refer to all technical details in the foregoing (4). For the non-uniform constellation, refer to all technical details in the foregoing (5). Optionally, the demodulation apparatus may further include a memory. The memory is configured to store instructions executed by the processor.

In a possible product form, the modulation apparatus or the demodulation apparatus in embodiments of this application may be implemented by a general-purpose processor.

A general-purpose processor for implementing the modulation apparatus includes a processing circuit and an output interface that is internally connected to and communicates with the processing circuit. The processing circuit is configured to modulate data by using a non-uniform constellation. For an optimization criterion of the non-uniform constellation, refer to all technical details in the foregoing (4). For the non-uniform constellation, refer to all technical details of the foregoing (5). The output interface is configured to send the modulated data. Optionally, the general-purpose processor may further include a storage medium. The storage medium is configured to store instructions executed by the processing circuit.

A general-purpose processor for implementing the demodulation apparatus includes a processing circuit and an input interface that is internally connected to and communicates with the processing circuit. The input interface is configured to receive air interface data, and the processing circuit is configured to demodulate the air interface data based on a non-uniform constellation. For an optimization criterion of the non-uniform constellation, refer to the foregoing (4). For all technical details of the non-uniform constellation, refer to all technical details of the foregoing (5). Optionally, the general-purpose processor may further include a storage medium. The storage medium is configured to store instructions executed by the processing circuit.

In a possible product form, the modulation apparatus or the demodulation apparatus in embodiments of this application may also be implemented by using one or more FPGAs (field programmable gate array), PLDs (programmable logic device), controllers, state machines, logic gates, discrete hardware components, any other suitable circuits, or any combination of circuits that can perform various functions described in this application.

It should be understood that the term "and/or" in this specification describes only an association relationship between associated objects and represents that one of three relationships may exist. For example, A and/or B may represent any one of the following three cases: Only A exists, both A and B exist, or only B exists. In addition, the character "/" in this specification generally indicates an "or" relationship between the associated objects.

A person of ordinary skill in the art may be aware that, in combination with the method steps and units described in embodiments disclosed in this specification, this application may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, to be specific, may be located in one position, or may be distributed on a plurality of network units. A part or all of the units may be selected based on actual requirements to achieve the objectives of the solutions of embodiments of this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods in embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A modulation method, comprising:
    modulating data by using a non-uniform constellation to generate modulated data, wherein the non-uniform constellation is a constellation in which constellation points are not uniformly spaced; and
    sending the modulated data,
    wherein, when the non-uniform constellation is a 1024-point constellation, coordinates of constellation points of the 1024-point constellation on a real axis are as follows:
    1.941833
    1.693122
    1.355517
    1.524286
    0.784606
    0.903175
    1.185644
    1.040121
    0.042179
    0.129644
    0.295250
    0.208995
    0.670939
    0.557285
    0.379156
    0.478424

−1.941833
−1.693122
−1.355517
−1.524286
−0.784606
−0.903175
−1.185644
−1.040121
−0.042179
−0.129644
−0.295250
−0.208995
−0.670939
−0.557285
−0.379156
−0.478424;
and coordinates of the constellation points of the 1024-point constellation on an imaginary axis are as follows:
1.941833
1.693122
1.355517
1.524286
0.784606
0.903175
1.185644
1.040121
0.042179
0.129644
0.295250
0.208995
0.670939
0.557285
0.379156
0.478424
−1.941833
−1.693122
−1.355517
−1.524286
0.784606
0.903175
−1.185644
−1.040121
−0.042179
−0.129644
−0.295250
−0.208995
−0.670939
−0.557285
−0.379156
−0.478424;
wherein, when the non-uniform constellation is a 4096-point constellation, coordinates of constellation points of the 4096-point constellation on a real axis are as follows:
2.038418
1.906150
1.673531
1.791411
1.263222
1.345497
1.572115
1.461245
0.754046
0.813916
0.915804
0.863190
1.177789
1.099763
0.979362
1.026466
0.046434
0.052468
0.141902
0.138874
0.319658
0.316081
0.223953
0.232252
0.697716
0.654974
0.569488
0.591522
0.398584
0.413151
0.502350
0.491908
−2.038418
−1.906150
−1.673531
−1.791411
−1.263222
−1.345497
−1.572115
−1.461245
−0.754046
−0.813916
−0.915804
−0.863190
−1.177789
−1.099763
−0.979362
−1.026466
−0.046434
−0.052468
−0.141902
−0.138874
−0.319658
−0.316081
−0.223953
−0.232252
−0.697716
−0.654974
−0.569488
−0.591522
−0.398584
−0.413151
−0.502350
−0.491908;
and coordinates of the constellation points of the 4096-point constellation on an imaginary axis are as follows:
2.038418
1.906150
1.673531
1.791411
1.263222
1.345497
1.572115
1.461245
0.754046
0.813916
0.915804
0.863190
1.177789
1.099763

0.979362
1.026466
0.046434
0.052468
0.141902
0.138874
0.319658
0.316081
0.223953
0.232252
0.697716
0.654974
0.569488
0.591522
0.398.584
0.413151
0.502350
0.491908
−2.038418
−1.906150
−1.673531
−1.791411
−1.263222
−1.345497
−1.572115
−1.461245
−0.754046
−0.813916
−0.915804
−0.863190
−1.177789
−1.099763
−0.979362
−1.026466
−0.046434
−0.052468
−0.141902
−0.138874
−0.319658
−0.316081
−0.223953
−0.232252
−0.697716
−0.654974
−0.569488
−0.591522
−0.398584
−0.413151
−0.502350
−0.491908.

2. A communication apparatus, comprising: at least one processor, and a memory storing instructions that, when executed by the at least one processor, cause the communication apparatus to perform operations comprising:
modulating data by using a non-uniform constellation to generate modulated data, wherein the non-uniform constellation is a constellation in which constellation points are not uniformly spaced; and
sending the modulated data,
wherein, when the non-uniform constellation is a 1024-point constellation, coordinates of constellation points of the 1024-point constellation on a real axis are as follows:
1.941833
1.693122
1.355517
1.524286
0.784606
0.903175
1.185644
1.040121
0.042179
0.129644
0.295250
0.208995
0.670939
0.557285
0.379156
0.478424
−1.941833
−1.693122
−1.355517
−1.524286
−0.784606
−0.903175
−1.185644
−1.040121
−0.042179
−0.129644
−0.295250
−0.208995
−0.670939
−0.557285
−0.379156
−0.478424
and coordinates of the constellation points of the 1024-point constellation on an imaginary axis are as follows:
1.941833
1.693122
1.355517
1.524286
0.784606
0.903175
1.185644
1.040121
0.042179
0.129644
0.295250
0.208995
0.670939
0.557285
0.379156
0.478424
−1.941833
−1.693122
−1.355517
−1.524286
−0.784606
−0.903175
−1.185644
−1.040121
−0.042179
−0.129644
−0.295250
−0.208995
−0.670939
−0.557285
−0.379156
−0.478424;
Wherein, when the non-uniform constellation is a 4096-point constellation, coordinates of constellation points of the 4096-point constellation on a real axis are as follows:

2.038418
1.906150
1.673531
1.791411
1.263222
1.345497
1.572115
1.461245
0.754046
0.813916
0.915804
0.863190
1.177789
1.099763
0.979362
1.026466
0.046434
0.052468
0.141902
0.138874
0.319658
0.316081
0.223953
0.232252
0.697716
0.654974
0.569488
0.591522
0.398584
0.413151
0.502350
0.491908
−2.038418
−1.906150
−1.673531
−1.791411
−1.263222
−1.345497
−1.572115
−1.461245
−0.754046
−0.813916
−0.915804
−0.863190
−1.177789
−1.099763
−0.979362
−1.026466
−0.046434
−0.052468
−0.141902
−0.138874
−0.319658
−0.316081
−0.223953
−0.232252
−0.697716
−0.654974
−0.569488
−0.591522
−0.398584
−0.413151
−0.502350
−0.491908;

and coordinates of the constellation points of the 4096-point constellation on an imaginary axis are as follows:

2.038418
1.906150
1.673531
1.791411
1.263222
1.345497
1.572115
1.461245
0.754046
0.813916
0.915804
0.863190
1.177789
1.099763
0.979362
1.026466
0.046434
0.052468
0.141902
0.138874
0.319658
0.316081
0.223953
0.232252
0.697716
0.654974
0.569488
0.591522
0.398584
0.413151
0.502350
0.491908
−2.038418
−1.906150
−1.673531
−1.791411
−1.263222
−1.345497
−1.572115
−1.461245
−0.754046
−0.813916
−0.915804
−0.863190
−1.177789
−1.099763
−0.979362
−1.026466
−0.046434
−0.052468
−0.141902
−0.138874
−0.319658
−0.316081
−0.223953
−0.232252
−0.697716
−0.654974
−0.569488
−0.591522
−0.398584
−0.413151
−0.502350
−0.491908.

3. A communication apparatus, comprising:
at least one processor, and a memory storing instructions that, when executed by the at least one processor, cause the communication apparatus to perform operations comprising:
receiving air interface data; and
demodulating the air interface data based on a non-uniform constellation, wherein the non-uniform constellation is a constellation in which constellation points are not uniformly spaced,
wherein, when the non-uniform constellation is a 1024-point constellation, coordinates of constellation points of the 1024-point constellation on a real axis are as follows:
1.941833
1.693122
1.355517
1.524286
0.784606
0.903175
1.185644
1.040121
0.042179
0.129644
0.295250
0.208995
0.670939
0.557285
0.379156
0.478424
−1.941833
−1.693122
−1.355517
−1.524286
−0.784606
−0.903175
−1.185644
−1.040121
−0.042179
−0.129644
−0.295250
−0.208995
0.670939
0.557285
−0.379156
−0.478424;
and coordinates of the constellation points of the 1024-point constellation on an imaginary axis are as follows:
1.941833
1.693122
1.355517
1.524286
0.784606
0.903175
1.185644
1.040121
0.042179
0.129644
0.295250
0.208995
0.670939
0.557285
0.379156
0.478424
−1.941833
−1.693122
−1.355517
−1.524286
−0.784606
−0.903175
−1.185644
−1.040121
−0.042179
−0.129644
−0.295250
−0.208995
−0.670939
−0.557285
−0.379156
−0.478424;
wherein, when the non-uniform constellation is a 4096-point constellation, coordinates of constellation points of the 4096-point constellation on a real axis are as follows:
2.038418
1.906150
1.673531
1.791411
1.263222
1.345497
1.572115
1.461245
0.754046
0.813916
0.915804
0.863190
1.177789
1.099763
0.979362
1.026466
0.046434
0.052468
0.141902
0.138874
0.319658
0.316081
0.223953
0.2322.52
0.697716
0.654974
0.569488
0.591522
0.398584
0.413151
0.502350
0.491908
−2.038418
−1.906150
−1.673531
−1.791411
−1.263222
−1.345497
−1.572115
−1.461245
−0.754046
−0.813916
−0.915804
−0.863190
−1.177789
−1.099763
−0.979362
−1.026466
−0.046434
−0.052468

−0.141902
−0.138874
−0.319658
−0.316081
−0.223953
−0.232252
−0.697716
−0.654974
−0.569488
−0.591522
−0.398584
−0.413151
−0.502350
−0.491908;
and coordinates of the constellation points of the 4096-point constellation on an imaginary axis are as follows:
2.038418
1.906150
1.673531
1.791411
1.263222
1.345497
1.572115
1.461245
0.754046
0.813916
0.915804
0.863190
1.177789
1.099763
0.979362
1.026466
0.046434
0.052468
0.141902
0.138874
0.319658
0.316081
0.223953
0.232252
0.697716
0.654974
0.569488
0.591522
0.398584
0.413151
0.502350
0.491908
−2.038418
−1.906150
−1.673531
−1.791411
−1.263222
−1.345497
−1.572115
−1.461245
−0.754046
−0.813916
−0.915804
−0.863190
−1.177789
−1.099763
−0.979362
−1.026466
−0.046434
−0.052468
−0.141902
−0.138874
−0.319658
−0.316081
−0.223953
−0.232252
−0.697716
−0.654974
−0.569488
−0.591522
−0.398584
−0.413151
−0.5023.50
−0.491908.

* * * * *

UNITED STATES PATENT AND TRADEMARK OFFICE
CERTIFICATE OF CORRECTION

| | | |
|---|---|---|
| PATENT NO. | : 12,137,021 B2 | Page 1 of 1 |
| APPLICATION NO. | : 17/961709 | |
| DATED | : November 5, 2024 | |
| INVENTOR(S) | : Guido Montorsi et al. | |

It is certified that error appears in the above-identified patent and that said Letters Patent is hereby corrected as shown below:

In the Specification

Column 5, Line 56, change "ma" to --*m*--.

Signed and Sealed this
Seventeenth Day of December, 2024

Derrick Brent
*Acting Director of the United States Patent and Trademark Office*